March 28, 1944.                F. PHILLIPS                2,345,425
                                SOD CUTTER
                           Filed Aug. 3, 1940          2 Sheets-Sheet 1

INVENTOR.
Frank Phillips,
BY Hood & Hahn
ATTORNEY.

March 28, 1944.  F. PHILLIPS  2,345,425
SOD CUTTER
Filed Aug. 3, 1940  2 Sheets-Sheet 2

INVENTOR.
Frank Phillips,
BY Hood + Hahn
ATTORNEY.

Patented Mar. 28, 1944

2,345,425

UNITED STATES PATENT OFFICE 2,345,425

SOD CUTTER

Frank Phillips, La Fayette, Ind.

Application August 3, 1940, Serial No. 350,492

16 Claims. (Cl. 97—226)

In stripping sod from its beds, it has been universal practice to use machines which are so designed that a knife, substantially stationary on the machine bed, is dragged by main force through the ground, bulling its way against the resistance of the earth and of movable obstructions, and either breaking, or hanging up the machine, or throwing the whole machine upwardly upon encountering relatively immovable objects. As a result, sod cutting has been slow, expensive, and relatively rough and inaccurate.

It is the primary object of this invention to provide a machine which shall move rapidly over a sod bed, stripping the sod smoothly and evenly to a relatively accurately maintained depth, in strips of accurately maintained width. The machine of the present invention cuts through most obstacles sharply and readily, but is so constructed that, if the knife strikes a relatively immovable obstruction, the knife only will be thrown momentarily upward to clear the obstruction without interrupting the travel of the machine and without imposing undue shocks upon any part of the machine. The machine is power driven and automotive and is preferably provided with automatic means for cutting the sod being stripped into pieces of desired and predetermined length. The essential primary feature of the machine is the provision of a sod-cutting knife power-driven to reciprocate rapidly in the line of movement of the machine, such reciprocation taking place either in a plane or in a long-radius arc.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
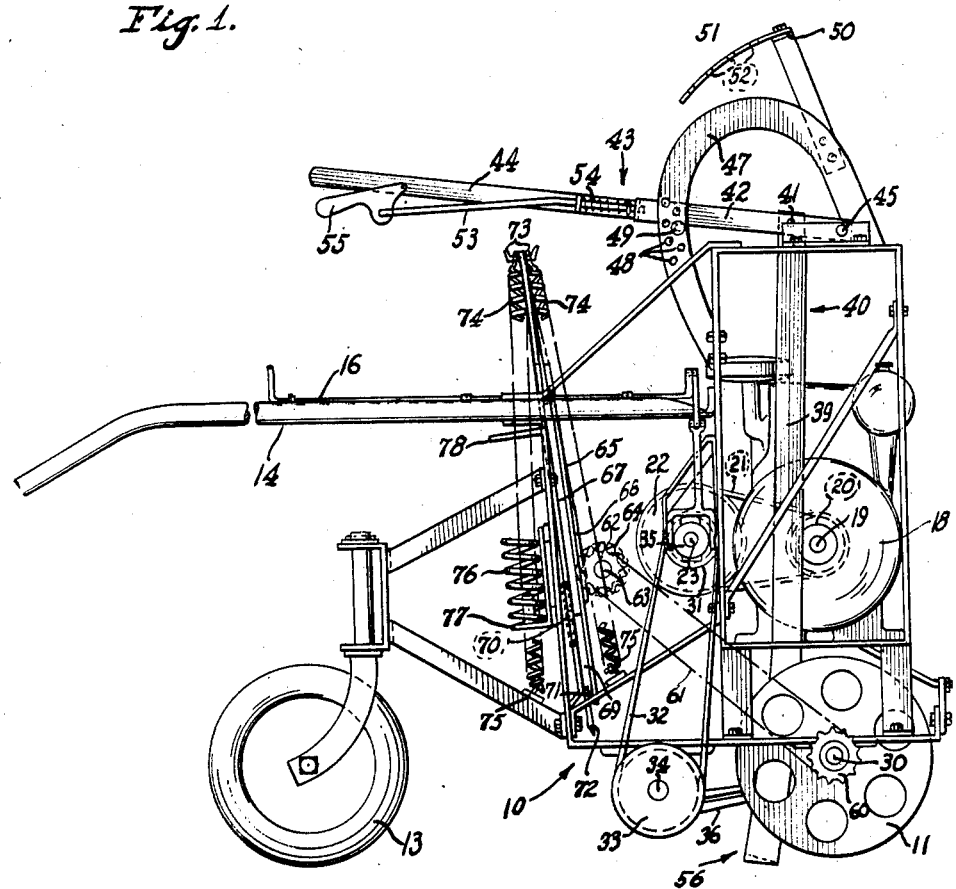
Fig. 1 is a side elevation of my sod cutting machine.

Referring more particularly to the drawings, it will be seen that I have provided a carriage, indicated generally by the reference numeral 10, mounted upon traction wheels 11 and 12 and a caster wheel 13. Handle bars 14 and 15 are provided for guiding the machine, and the major control levers 16 and 17 are led along said bars to be accessible to the guiding operator.

A prime mover 18, such as a gasoline engine, is suitably mounted on the carriage 10, and the output shaft 19 of said prime mover carries one or more sheaves 20 which, through a corresponding number of belts 21, drive to a corresponding number of sheaves 22 on a power-delivery shaft 23 suitably journalled transversely of the carriage 10.

Loosely mounted on the shaft 23 is a sheave 24 adapted to be drivingly connected to the shaft 23 through the medium of any standard form of clutch mechanism 25 operable by control lever 17 through a suitable linkage. The sheave 24 drives, through a belt 26, a sheave 27 on the input shaft 28 of a gear reduction unit or selective speed transmission 29, the output shaft (not shown) of which is parallel with and below the shaft 28 and is operatively connected to drive the axle 30 on which the traction wheels 11 and 12 are fixed. It may be noted here that, of course, each of the belt drives referred to herein may consist either of a single belt forming a driving connection between a single pair of sheaves, or of a plurality of belts forming a driving connection between a plurality of pairs of sheaves.

Thus it will be seen that, when the clutch 25 is engaged, the machine will be automatically driven over the sod bed to be stripped.

Loosely mounted on the power-delivery shaft 23 is a pair of sheaves 31 drivingly connected, by belts 32, to a pair of sheaves 33 fixed on a crank shaft 34 suitably journalled transversely of the carriage. A clutch 35 of suitable standard construction is provided for drivingly connecting the sheaves 31 to the shaft 23, being operable by the lever 16 through suitable linkage.

Operatively journalled on the cranks of the shaft 34 are two pitmans 36, 37, the opposite ends of which are journalled on trunnion 38 supported between the arms 39 of a knife-carrying frame 40. The upper ends of the arms 39 of the frame 40 are pivotally mounted at 41 on the arms 42, 42 of a yoke indicated generally by the reference numeral 43 and having a handle projection 44 leading to a point of convenient accessibility to the operator. The yoke 43 is pivotally mounted on the carriage through a rod 45, to swing through an arc to raise and lower the pivotal axis of the knife-carrying frame 40 for a reason which will appear hereinafter.

Two frame members 47, 47 lie closely adjacent the respective arms 42, 42 of the yoke 43 and are provided respectively with a plurality of pairs of aligned apertures 48 adapted selectively to receive and support a stop rod 49 upon which the yoke arms 42 are adapted to rest. It will be apparent that the positioning of the stop rod 49 will predetermine the level of the pivotal axis of the frame 40, and so the operating level of the stripping knife. It will further be apparent, however, that, if the knife encounters a stubborn obstacle, the knife, the frame 40, and the yoke 43 are free to move upwardly without hindrance to clear the obstacle.

Supported from the elements 47 is a strap 50 carrying a sector 51; concentric with the rod 45 and formed with a plurality of spaced apertures 52. Reciprocably mounted on the yoke 43 is a rod 53, urged forwardly by a spring 54, and retractable by means of a hand lever 55 pivotally mounted on the projection 44. When it is desired to hold the knife out of cutting relation with the earth, the operator grasps the projection 44 and lever 55, retracts the rod 53, and lifts the yoke 43 to bring the rod 53 into registry with one of the apertures 52, and releases the lever 55 to permit the spring 54 to project the rod 53 into such aperture, whereby the yoke 43 and knife-carrying frame 40 will be held in such elevated position.

Figure 3:
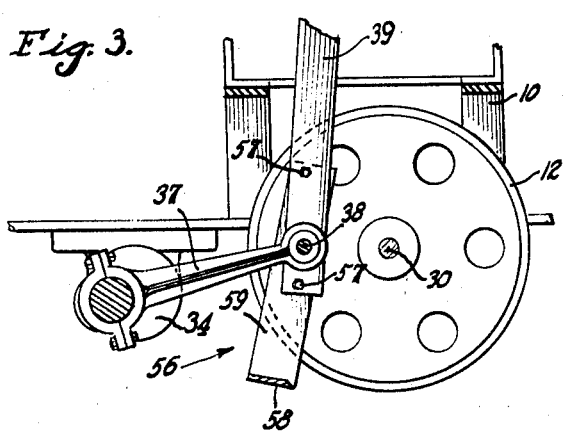
Fig. 3 is a fragmental longitudinal section, showing the means for reciprocating the cutter blade.
Figure 2:
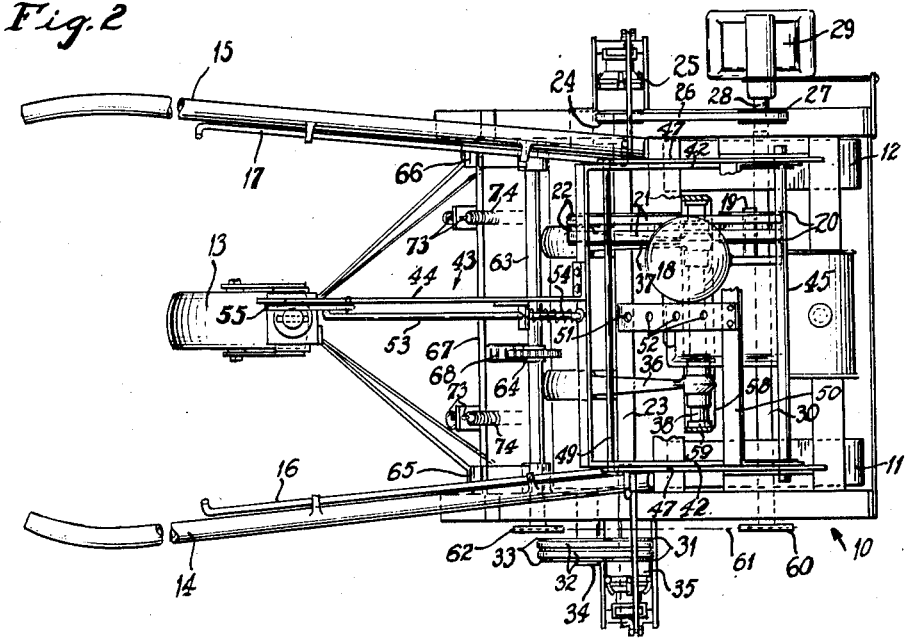
Fig. 2 is a plan view thereof.

The stripping knife proper is indicated generally by the reference numeral 56, and comprises a U-shaped strap of suitably hardened and sharpened metal supported on the lower ends of the frame arms 39 by bolts 57 or other equivalent fastening means. As is most clearly illustrated in Fig. 3, the knife is preferably carried rearwardly in order to provide the optimum angle of attack and desired clearance. This arrangement, while not absolutely essential, is desirable in that it facilitates initial entry of the knife into the sod, and further causes the knife, on each backward stroke, to lift slightly the section of sod just previously severed from its bed, thus loosening the sod strip as the machine moves over the ground to facilitate subsequent removal thereof.

The base or transverse portion 58 of the knife 56 obviously acts to effect a horizontal cut, freeing the sod from the earth while the vertical arms 59 cut the desired strip away from the laterally adjacent portions of the sod bed.

It will be clear from the above description that, if the prime mover 18 is running, the operator, having engaged the rod 53 in one of the apertures 52, may operate the lever 17 to engage the clutch 25, whereby the traction wheels 11 and 12 will be driven to move the machine automotively to a point of use, where the operator will disengage the clutch 25. The operator now inserts the rod 49 in that pair of apertures 48 which will support the yoke 43 at the desired subsurface level, disengages the rod 53, and permits the yoke 43 to move downwardly to bring the knife 56 to rest upon the ground.

The operator now manipulates the lever 16 to engage the clutch 35, whereupon the crank shaft 34 will be driven to operate the pitmans 36 and 37 to oscillate the knife-carrying frame rapidly about the pivotal axis 41 thereof. The knife 56 will immediately dig into the ground to a point at which the yoke arms 42, 42 come to rest upon the rod 49, where a cutting level will be established. The operator now engages the clutch 25 and the machine will move off automatically down the row of sod to be cut, with the knife vibrating rapidly in the general line of movement of the machine and cutting by impact rather than by the brute force of dragging as has been customary in the past.

I find that, with the present machine I can not only move down the row much faster than has ever been possible with prior machines known to me, but can further obtain sod strips of very materially more accurate width and thickness than has been possible in the past, with no torn or mangled portions to constitute waste.

It is necessary, of course, to limit the length of a piece of sod to be handled; and the work of the sod-layer is facilitated if he is supplied with strips all of which are of the same length. I have therefore provided means in the present machine for accurately and automatically cutting the newly-severed sod into strips of uniform length.

The axle 30 carries a sprocket 60 which is connected, by a chain 61, to drive a sprocket 62 fixed to a shaft 63 suitably journalled on the carriage. Likewise fixed to the shaft 63 is a mutilated gear 64.

Mounted for reciprocation in slideways 65 and 66 is a plate 67 provided with a rack 68 with which the teeth of the mutilated gear 64 mesh. I have found that one inexpensive expedient for providing a rack on the solid metal plate 67 is to weld to the face thereof a section of chain, and to use a mutilated gear having sprocket teeth.

To the lower edge of the plate 67 is secured a metal flap 69 through the medium of a hinge 70; and the lower edge of the flap 69 is rabbeted as at 71 to receive a knife blade 72.

At its upper edge, the plate 67 carries a plurality of hooks 73 to which are secured the upper ends of a plurality of coiled springs 74, the lower ends of which are secured to hooks 75 on the carriage frame. A single, heavy coiled spring 76 is mounted on a bracket 77 on the carriage and is disposed in the path of a bumper bracket 78 carried by the plate 67.

As the axle 30 rotates, the shaft 63 is driven by the sprockets 60 and 62 and the chain 61 to rotate the mutilated gear 64. This rotation, because of the engagement of the teeth of said gear 64 with the rack 68, slowly lifts the plate 67 against the tendency of the springs 74, until the mutilated portion of the gear 64 comes into registry with the rack 68. At this point, the gear 64 releases the rack 68, and the plate 67 is violently flung downwardly by the springs 74 to enter the ground and sever the strips of sod just previously loosened from the strip currently being cut.

Just before the blade 72 strikes the ground, the bumper bracket 78 contacts the top of the spring 76, but the momentum of the plate 67 carries the knife 72 far enough into the ground, compressing the spring 76, to sever the sod strips. Upon exhaustion of that momentum, however, the spring 76 promptly returns the plate 67 to a position in which the knife 72 clears the ground; whereupon the teeth of the mutilated gear 64 pick up the rack 68 to initiate a repetition of the above-described cycle.

Because the carriage 10 moves forward continuously, it is necessary to provide means to prevent the knife 72, while engaged in the ground from rumpling or otherwise damaging the trailing end of the new sod strip being cut. It is for this reason that the knife-carrying flap 69 is hinged to the plate 67. It will be seen that, as the carriage moves forward during engagement of the knife 72 in the ground, the flap 69 will rotate about the axis of the hinge 70 to prevent damage to the sod; and the knife will be inclined rearwardly and downwardly during withdrawal thereof from the ground.

I claim as my invention:

1. A sod cutter comprising a wheeled carriage, a knife mounted thereon and having a horizontal blade portion supported at its lateral extremities only and adapted to be guided for movement at a level below the ground-engaging portions of the carriage wheels, and means for mechanically oscillating said knife in the line of movement of said carriage.

2. A sod cutter comprising a wheeled carriage, a prime mover on said carriage, a knife mounted on said carriage and having a horizontal blade portion supported at its lateral extremities only and adapted to be guided for movement at a level below the ground-engaging portions of the carriage wheels, and means connecting said prime mover to oscillate said knife in the direction of movement of said carriage upon a radius larger than the stroke of said knife.

3. A sod cutter comprising a wheeled carriage, a prime mover on said carriage, a knife mounted on said carriage and having a horizontal blade portion adapted to be guided for movement at a level below the ground-engaging portions of the carriage wheels, means connecting said prime mover to drive certain of the wheels of said carriage, and means independent of said first-named means for mechanically oscillating said knife in the line of movement of said carriage.

4. A sod cutting machine comprising a wheeled carriage, a knife mounted for substantially vertical reciprocation with respect to said carriage, resilient means resisting movement of said knife to a level below the level of the ground-engaging portions of the carriage wheels, spring means resisting movement of said knife above a predetermined level, and means for moving said knife materially above such level, thereby tensioning said spring means, and for automatically releasing said knife after so tensioning said means, whereby said knife is thrown below said first-namel level against the tendency of said resilient means and is subsequently returned above said first-named level by said resilient means.

5. A sod cutting machine comprising a wheeled carriage, a knife mounted for substantially vertical reciprocation with respect to said carriage, spring means resiliently resisting movement of said knife vertically out of a predetermined level above the ground, and means for lifting said knife, against the tendency of said spring means, materially above the ground level and for then releasing said knife, whereby said knife is thrown downwardly and, by momentum, past the ground level and then returned resiliently to such predetermined level.

6. A sod cutting machine comprising a wheeled carriage, a knife mounted for substantially vertical reciprocation with respect to said carriage, spring means resiliently resisting movement of said knife vertically out of a predetermined level above the ground, a rack operatively associated with said knife, a mutilated gear operatively associated with said rack, and means for rotating said mutilated gear in timed relation to the rotation of the carriage wheels to lift said knife, against the tendency of said spring means, materially above the ground level and then to release said knife, whereby said knife is thrown downwardly and, by momentum, past the ground level and then returned resiliently to such predetermined level.

7. A sod cutter comprising a wheeled carriage, a prime mover on said carriage, a knife mounted on said carriage and having a horizontal blade portion adapted to be guided for movement at a level below the ground-engaging portions of the carriage wheels, means connecting said prime mover to drive certain of said wheels, means for mechanically vibrating said knife in the line of movement of said carriage, a second knife mounted on said carriage for substantially vertical reciprocation, resilient means resiliently resisting movement of said second knife vertically out of a predetermined level above the ground, and means operating in timed relation to the rotation of said carriage wheels for lifting said second knife, against the tendency of said resilient means, materially above the ground level and for then releasing said second knife, whereby said second knife is thrown downwardly and, by momentum, past the ground level and then returned resiliently to such predetermined level.

8. In a sod cutting machine, a wheeled carriage, a knife, means mounted on said carriage and guiding said knife for substantially vertical reciprocation, means for reciprocating said knife to drive the same into the ground, and means hingedly supporting said knife on said carriage and disposed below said guiding means when said knife is in its lowermost position, whereby said knife is tilted rearwardly and downwardly upon forward movement of said carriage during engagement of said knife in the ground.

9. In a sod cutting machine, a carriage, a knife having a horizontal blade portion, an element supporting said knife, means providing a pivotal support for said element on said carriage, said last-named means being adjustable to vary the vertical position of said support with respect to said carriage, and means for mechanically vibrating said element in the line of movement of said carriage.

10. In a sod cutting machine, a carriage, a knife having a horizontal blade portion, an element supporting said knife for swinging movement on a substantially horizontal axis, means for varying the vertical position of said element and said knife with respect to said carriage, and means for mechanically vibrating said knife in the line of movement of said carriage.

11. In a sod cutting machine, a carriage, a knife supported on said carriage and having a horizontal blade portion, means limiting downward movement of said knife with respect to said carriage but leaving said knife free to move upwardly with respect to said carriage, and means for mechanically vibrating said knife in the line of movement of said carriage.

12. In a sod cutting machine, a carriage, an element mounted on said carriage for movement with respect thereto in a substantially vertical plane, a frame member pivotally mounted on said element for swinging movement in the line of travel of said carriage, means for mechanically oscillating said member about its pivotal axis, and a knife having a substantially horizontal blade portion carried at the lower end of said member.

13. In a sod cutting machine, a carriage, an element mounted on said carriage for movement with respect thereto in a substantially vertical plane, a frame member pivotally mounted on said element for swinging movement in the line of travel of said carriage, means for mechanically oscillating said member about its pivotal axis, and a knife having a substantially horizontal blade portion carried at the lower end of said member, the backward portion of the stroke of said member carrying it beyond the vertical.

14. In a sod cutting machine, a carriage, an element mounted on said carriage for movement with respect thereto in a substantially vertical plane, a frame member pivotally mounted on said element for swinging movement in the line of travel of said carriage, means for mechanically oscillating said member about its pivotal axis, and a U-shaped knife carried at the lower end of said member, the upper surface of the base portion of said blade being inclined rearwardly and upwardly with respect to a line joining said base portion of the blade with the pivotal axis of said member.

15. In a sod cutting machine, a carriage, an element mounted on said carriage for movement with respect thereto in a substantially vertical plane, a frame member pivotally mounted on said element for swinging movement in the line of travel of said carriage, means for mechanically oscillating said member about its pivotal axis, and a U-shaped knife carried at the lower end of said member, the legs of said blade being inclined rearwardly and downwardly with respect to said member, and the upper surface of the base portion of said blade being perpendicular to said legs.

16. In a sod cutting machine, a carriage, a frame member pivotally mounted on said carriage for swinging movement in the line of travel of said carriage, means for mechanically oscillating said member about its pivotal axis, and a knife having a substantially horizontal blade portion carried at the lower end of said member and supported therefrom at its lateral extremities only.

FRANK PHILLIPS.